(No Model.)
C. E. WORLINE.
CLAMP DEVICE.
No. 282,479. Patented July 31, 1883.
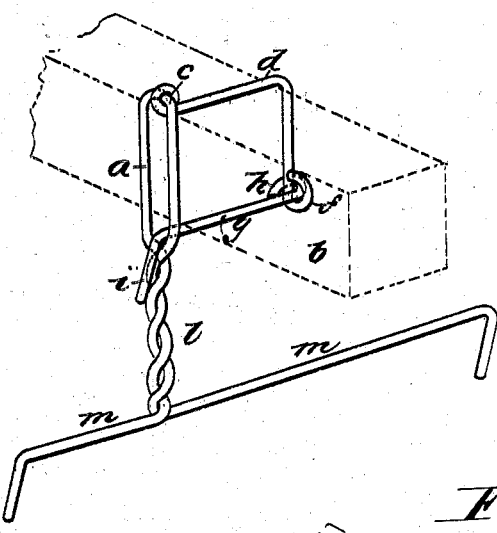
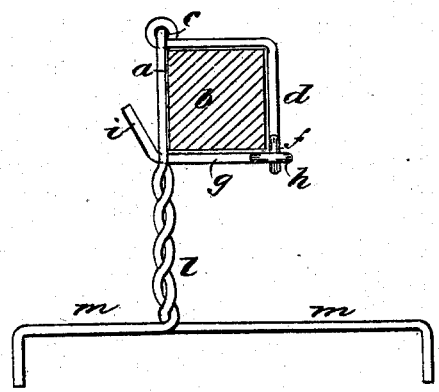
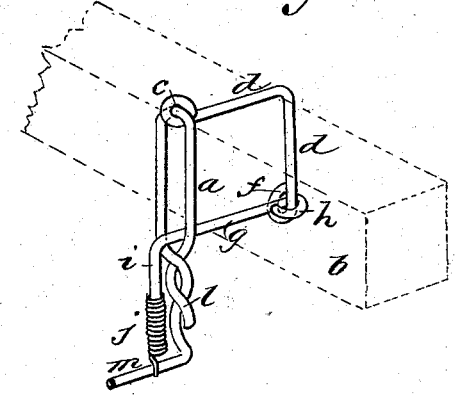
WITNESSES:
Francis McArdle
C. Sedgwick
INVENTOR:
C. E. Worline
BY Munn & Co
ATTORNEYS.

UNITED STATES PATENT OFFICE.

CHAUNCEY E. WORLINE, OF RADNOR, OHIO.

CLAMP DEVICE.

SPECIFICATION forming part of Letters Patent No. 282,479, dated July 31, 1883.

Application filed April 14, 1883. (No model.)

*To all whom it may concern:*

Be it known that I, CHAUNCEY E. WORLINE, of Radnor, in the county of Delaware and State of Ohio, have invented a new and Improved Clamp Device, of which the following is a full, clear, and exact description.

My invention consists of a simple contrivance for the construction of a clamp device for fastening any object to the beam of a plow, as a weed and grass turner or a colter, and also being adapted for a splice-clamp for beams and other objects required to be clamped together. Different parts of the clamp can be extended in various directions to form various useful devices, as a novel contrivance of a weed-turning extension of said clamp for bending over and turning down the weeds and grass in advance of the plow mold-board, to cause them to be more effectually and completely covered in the furrows, all as hereinafter fully described.

Reference is to be had to the accompanying drawings, forming part of this specification, in which similar letters of reference indicate corresponding parts in all the figures.

Figure 1 is a perspective view of my improved clamp and weed-turning extension and a portion of the beam of a plow, the latter being in dotted lines. Fig. 2 is a transverse section of the plow-beam and front elevation of the clamp and extension. Fig. 3 is a perspective view, showing the application of a fastening device to prevent the clamp from working loose, and a modified form of the weed-turning extension.

First I make a link, $a$, preferably of round iron, a little longer than one of the vertical sides of the beam $b$, and connect the upper end with an eye, $c$, of an angle-rod, $d$, crossing two sides of the beam, and terminating at the lower edge of the opposite side of the beam in another eye, $f$, and having a rod, $g$, connected with it by eye $h$, allowing said rod $g$ to turn half a revolution on its axis. This rod $g$ extends from eye $f$ across the under side of the beam, and connects with link $a$ by passing through the lower end of it, the connection being effected by swinging the link down over the projecting extension $i$ of rod $g$, which is bent more or less, as in Figs. 1 and 2, so that when the extension is turned up, as in Fig. 2, said link will swing under it, the said extension being to hold the link fast when turned down, as in Figs. 1 and 3.

A fastening device consisting of a coil of wire, $j$, may be employed, if necessary, to prevent it from working loose by being slipped onto the extension $i$ and hooked to any object, as the arm $m$ of a weed-turning extension; but it is manifest that when so made the rod $g$ and its extension $i$ will draw the eye $f$ and link $a$ firmly against the sides of the plow-beam or other object to which the clamp is applied, and the friction will prevent the fastening-rod from working loose.

It will be seen that such a clamp will fasten a colter against the side of the plow-beam, if made with provision for a little space for the colter, and will clamp other objects, as two bars or timbers, together.

The fastening-rod $g$ may have a bend at the middle to swing against the side of the beam when the rod comes to the fastening position to bind firmly against the beam.

The link $a$ may terminate under the fastening-rod $g$ when the clamp alone is required; but for the purposes of a weed-turning extension for plows I prefer to make it of a long rod by bending the same in the middle and twisting the members together in extension $l$, beyond the link, from the beam downward, a suitable distance, and then branch out each way to form weed-turning arms $m$, as in Figs. 1 and 2, or a single arm, as in Fig. 3, or in any approved arrangement; or the weed-turning arms or other required attachments may be made in extension of rod $d$ from eyes $c$ or $f$, and various other modifications can be made.

It will be seen that by the use of small round bar-iron this improved clamp and attachments, as I have suggested, may be quickly and cheaply constructed by merely bending the rods in suitable shapes, so that any one requiring such devices may have the means of producing the same wherever the iron can be obtained, and the clamp device can be put on or taken off almost instantly with a wrench or other suitable tool.

Having thus described my invention, I claim as new and desire to secure by Letters Patent—

1. The improved plow attachment, consisting of clamp $a$, $d$, and $g$, extension $l$ of link $a$, and one or more branches or arms of said extension $l$, forming a weed-turning attachment to the plow-beam, substantially as described.

2. The combination of a fastening device, $j$, with the bent arm $i$ of the fastening-rod $g$, angle-rod $d$, and link $a$, substantially as described.

CHAUNCEY E. WORLINE.

Witnesses:
H. CAREY WORLINE,
EUNICE WORLINE.